United States Patent
Lawler et al.

(10) Patent No.: US 7,711,741 B2
(45) Date of Patent: May 4, 2010

(54) DESENSITIZING DATA IN CLONING

(75) Inventors: Ian Lawler, Menlo Park, CA (US); Yali Wu, Foster City, CA (US)

(73) Assignee: Oracle International Corp., Redwood Shores, CA (US)

( * ) Notice: Subject to any disclaimer, the term of this patent is extended or adjusted under 35 U.S.C. 154(b) by 323 days.

(21) Appl. No.: 11/803,399

(22) Filed: May 14, 2007

(65) Prior Publication Data

US 2008/0288548 A1 Nov. 20, 2008

(51) Int. Cl.
*G06F 7/00* (2006.01)
*G06F 17/30* (2006.01)
(52) U.S. Cl. ........ 707/756; 707/757
(58) Field of Classification Search ........ None
See application file for complete search history.

(56) References Cited

U.S. PATENT DOCUMENTS

2003/0014394 A1 * 1/2003 Fujiwara et al. ........ 707/3
2003/0167277 A1 * 9/2003 Hejlsberg et al. ........ 707/102
2004/0107277 A1 * 6/2004 Levesque et al. ........ 709/223

* cited by examiner

*Primary Examiner*—Uyen T. Le
(74) *Attorney, Agent, or Firm*—Kraguljac & Kalnay, LLC

(57) ABSTRACT

Systems, methods, media, and other embodiments associated with desensitizing data in cloning are described. One example method embodiment includes identifying a column to be desensitized and preparing a set of executable instructions to desensitize the column. The example method may also include organizing the set of executable instructions based on table-oriented relationships between instructions and then further organizing the set of executable instructions based on determinations concerning execution efficiency. The example method may be performed contemporaneously with the cloning of a database to produce a desensitized clone.

25 Claims, 6 Drawing Sheets

DESENSITIZING DATA IN CLONING

BACKGROUND

A database may be associated with a production system (e.g., online transaction processing (OLTP), online analytical processing (OLAP), analytics, front-office, back-office). The database may be cloned (e.g., copied as a whole) to allow work, testing, analysis, and so on, to be performed using the cloned data, leaving the original data to continue to support production (e.g., order processing, transaction processing). The data to be cloned may be arranged as columns in tables that support the production system. The cloned data may be referred to as a "clone".

Cloning may produce security issues with the clone. For example, the clone may not be as secure as the original, may not be run on equally secure hardware, may be exposed to people or processes that would not be allowed to access the original, and so on. Conventional approaches to address these security issues include manually removing sensitive data from a clone, manually running programs to remove sensitive data from a clone, encrypting sensitive data in a clone, and so on. However, these conventional approaches may consume unacceptable amounts of time and still not produce desired security leaving, for example, at least momentary insecurities. Furthermore, conventional approaches may make it difficult, if possible at all, to monitor the cloning process and/or the desensitizing process, which may in turn make it difficult, if possible at all, to perform a partial recovery from a failed cloning and/or desensitizing.

Cloning data involves selecting data to clone and then cloning it. Which data will be cloned may depend on why the clone is being produced. For example, a first clone may be produced to support testing a new feature while a second clone may be produced to support testing a bug fix. Similarly, a first clone may include data associated with a first set of applications while a second clone may include data associated with a second set of applications. In each example, a different set of data may be needed and the different sets may include different pieces of sensitive data. Conventionally it has been difficult, if possible at all, to have data that self-describes itself with respect to being desensitized. Thus, conventional cloning has involved intense, inflexible manual configuration that takes significant amounts of time and yet still produces insecure clones.

BRIEF DESCRIPTION OF THE DRAWINGS

The accompanying drawings, which are incorporated in and constitute a part of the specification, illustrate example systems, methods, and other example embodiments of aspects of the invention. It will be appreciated that the illustrated element boundaries in the figures represent one example of the boundaries. One of ordinary skill in the art will appreciate that one element may be designed as multiple elements or that multiple elements may be designed as one element, that an element shown as an internal component of another element may be implemented as an external component and vice versa, and that elements may not be drawn to scale.

DETAILED DESCRIPTION

Figure 1:
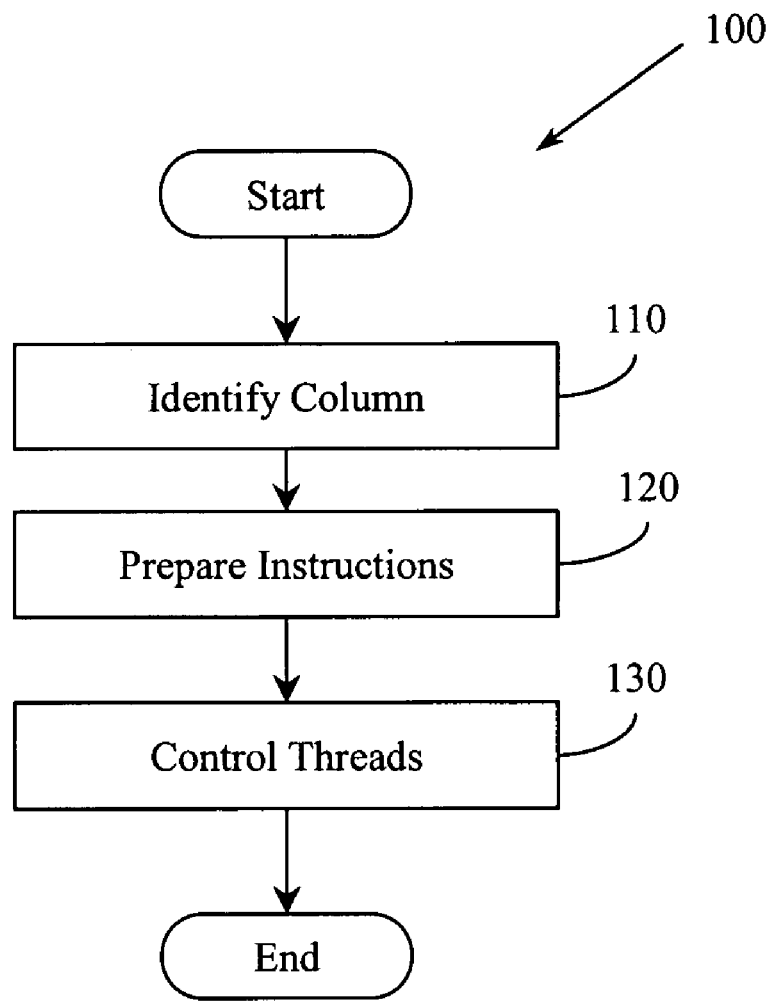
FIG. 1 illustrates an example method associated with desensitizing related to cloning.

Example systems and methods support cloning that will produce a more secure clone because sensitive data is desensitized (e.g., masked, removed, obfuscated, scrambled, simulated, counterfeited) in an irreversible manner. The desensitizing facilitates efficiently and accurately removing or masking sensitive information in production data (e.g., live data being used to support a business process) that leaves its production environment for purposes other than production including testing, patch checking, analysis, and so on. The desensitizing operation is fundamentally an update issued for a particular set of columns in a particular set of tables and/or a delete/truncate issued for a particular set of rows in a particular set of tables. Thus, desensitizing includes identifying columns and tables to desensitize, preparing instructions to do the desensitizing, and controlling threads to execute the instruction.

Desensitizing may include performing an update statement(s) for a particular column(s) in a particular table(s) so that the original data cannot be derived from the desensitized data and so that the desensitized data may not even be identified as desensitized data. An entry in a cloned column may be desensitized by setting its value using, for example, a SQL (structured query language) statement(s), a PL/SQL (procedural language/SQL) function, a constant, a value from a table, a random number, a random number within a defined range, and so on. Where the entry is desensitized by setting the value to the result of a statement(s) or function call, the desensitizing may be completed by executing the SQL statement(s) or calling the PL/SQL function(s) to be executed. Desensitizing may also include purging data from selected tables and/or secondary artifacts (e.g., redo log, database recovery structures). Therefore, desensitizing may include identifying and organizing information concerning which table(s) to act on, which column(s) to act on, how to desensitize the data, and so on.

Identifying columns to desensitize may involve processing stand alone configuration data and/or logically attached metadata. Configuration data may identify columns to desensitize, how they are to be desensitized, when they are to be desensitized, by which instructions they are to be desensitized, and so on. Metadata associated with a column and/or table may also describe columns to desensitize, how to desensitize a column, when to desensitize a column, and which executable instructions (e.g., function) are to perform the desensitization. Using the metadata facilitates delegating sensitivity determinations and in effect facilitates delegating desensitizing operations to those most familiar with the data.

Desensitizing may include performing a set of update operations. The set may include operations for multiple columns in multiple tables. Therefore, example systems and methods may include organizing the set of operations into smaller subsets of operations that may be sequenced, ordered, prioritized, and so on. For example, operations that act on the same table may be grouped together. Additionally, subsets of statements that may be performed in parallel may be identified. This may include splitting sets of operations into smaller sets.

In conventional cloning, update statements, no matter how long, may be assigned to a single worker and executed in their entirety before being committed. This may create rollback and/or exception handling issues during cloning. Therefore, example systems and methods may split longer update statements into subsets of related smaller statements that can be processed, committed, and/or rolled back individually and/or concurrently by multiple workers.

Example systems and methods may irreversibly desensitize selected portions of a set of data being cloned. The selected portions may be sensitive data (e.g., a social security number, a bank account balance, uniquely identifying data) that are not to be seen in the clone. Desensitizing selected data involves at least two actions, determining which data to desensitize and then desensitizing it. When a large amount of data is involved, desensitizing the data may proceed in controlled orders, including selectively in parallel.

In one example, desensitizing includes processing a set of tables that are populated by a first executable (e.g., Java control logic) and then read by a second executable (e.g., PL/SQL execution logic). The tables act as a contract and meeting point between a preparation phase and an execution phase. The result of the preparation phase may be a set of executable statements (e.g., SQL). Therefore, the execution phase may employ a set of executable threads (e.g., PL/SQL threads) to execute the statements. The set of executable threads may perform certain organizational actions before and/or while executing the desensitizing operations. These organizational actions may include identifying sets of executable instructions that can benefit from parallelization and the recruitment of additional executable threads to execute the instructions.

Before the executable threads do their work, several actions may occur in the preparation phase. One preparation action may involve identifying all the columns to be desensitized. Information concerning the columns may be retrieved from a configuration data store and/or may be retrieved from metadata associated with columns. Columns may be identified specifically and/or functionally. For example, an explicit column name (e.g., table x, column y) may be called out and/or a "functional column" (e.g., column that stores name) may be called out. This may lead to some duplication, which may be resolved later. Different columns may need to be desensitized for different applications. Thus, sets of columns may be organized into a "policy" that includes both explicit and/or functional column names. Similarly, different sets of columns may need to be desensitized for different sets of applications or for different cloning results. Thus, sets of policies may be organized into a policy set.

Another preparation action may involve resolving algorithms to be used for desensitizing. Resolving an algorithm may include identifying a logical algorithm and locating executable instructions that perform the physical transformations described by the algorithm. Different columns may have different formats, different sensitivity levels, different content, and so on, and thus may be processed in different ways. Additionally, columns may be desensitized differently for different cloning results. Thus, various algorithms may be available to desensitize these columns and information concerning which algorithms are to process which columns may be gathered and used to resolve (e.g., identify, acquire, address) an algorithm during preparation. Similarly, algorithms to be used for purging various tables may also be resolved.

Consider that different columns may include different data (e.g., credit card number, phone number, social security number, address, foreign zip code). Consider also that some cloning may be performed to produce a data set for statistical analysis, other cloning may be performed to produce a data set to test a newly available feature, and still other cloning may be performed to produce a data set to test a bug fix. In some cases, the values in a column to be desensitized may be irrelevant to the action performed on the clone. In these cases, the column may be removed or zeroed out or processed in other manners since the column will have no effect on the downstream processing. However, in other cases, the values in a column to be desensitized may be relevant to the action performed on the clone. For example, a new feature to be tested may depend on having data, at least pseudo-data, that mirrors a distribution discovered in the original data. In this case, where a distribution in the original data is relevant in processing performed on a clone, more sophisticated desensitizing algorithms that may produce a useful pseudo-data may be employed. For example, a desensitizing algorithm may compute the distribution present in the original data and then produce substitute data that has a similar distribution. Thus, a set of algorithms may be available to desensitize data and which algorithm(s) to use may be resolved at execution time (e.g., clone time, desensitize time).

Efficiency may be improved by performing single passes over various tables during the execution phase. Thus, one preparation action may include per table organization. For example, for a given table, the complete set of columns in the table that are to be desensitized may be identified and operations to be performed for that set of columns may be grouped together. Consider that it may be possible to process these columns using a single update statement and yet this single update statement may be computationally intense and thus consume significant time. The single update may be able to be executed in parallel and thus, when possible, the single update statement may be broken into smaller statements that may be candidates for parallelization. So, operations for columns in a given table may initially be grouped but then may subsequently be subdivided to facilitate more efficient computation.

Another preparation action may involve table processing. Thus, preparation may include grouping truncate requests and purge requests that operate on a given table with other update statements that operate on that given table. Similarly, preparation may include grouping into a single task PL/SQL programs that were supplied to operate on tables for which a delete or update statement has already been found. Within this single task, further preparation may occur. For example, on a per table basis, operations may be grouped so they can be executed in a single pass over the table.

Another preparation action may include weighting operations to be performed. The operations may be weighted based, for example, on the size of the underlying table, the type of operation to be performed, and so on. Thus, operations and/or sets of operations may be ordered based on weights. While weighting operations is described, it is to be appreciated that sets of operations may be weighted collectively. These sets of operations may be referred to as units and/or tasks.

Another preparation action may include grouping tasks (e.g., sets of operations) into bundles of tasks. The bundles of tasks may subsequently be assigned, during the execution phase, to different threads participating in the cloning. The entire collection of bundles of tasks may be referred to as a "run". The size of the bundles may depend, for example, on the anticipated number of threads that will be available to execute the instructions in the bundles.

Following some preparation, execution (e.g., desensitizing) may begin. Once again, several actions may occur during execution. Thus, when an executable thread, which may be referred to as a "worker", executes it may be controlled to perform several actions.

When a worker begins, it may be provided with an identifier of a run. The worker may therefore examine the run and find a bundle of executable instructions (e.g., a task) ready to be executed. Upon finding an eligible bundle, the worker may add an identifier to the bundle that establishes a relationship between the bundle and the worker. The worker may then examine the bundle and identify an operation within the bundle to execute. Which operation is selected may depend, for example, on weights assigned during preparation, on the size of an operation, on the size of a table on which the operation is to be executed, on the number of workers available to work on the operation, on the number of workers already working on the operation, and so on. These factors may be considered in order to allow the worker to find an operation to which the worker can contribute. In one example, examining the factors may facilitate identifying the operation to which the worker can make a contribution that will improve and/or optimize overall cloning and/or desensitizing efficiency.

When a worker is first assigned to a task, the worker may perform some additional organization. For example, the worker may determine whether parallelization is possible and/or warranted for the task. This determination may depend, for example, on the size of the table upon which the operation(s) is to be performed, on the type of operation(s) to be performed on the table, on the number of available workers, and so on. If parallelization is warranted, then the worker may split an underlying table into multiple sets of contiguous rows that can be processed in parallel.

When a worker performs a task on a table or on a portion of a table, the worker will execute the desensitizing operation (e.g., obfuscating, deleting, replacing) according to the executable instructions located when an algorithm was identified and resolved during the preparation phase. Thus, the worker may make a call (e.g., procedure call) to a stored executable. The worker may also check for stored or derived attributes attached to an operation that are to be computed before the operation or to be updated after the operation. When all the workers are done, if the run was successful, registered post-execution PL/SQL programs may be run to do cleanup activities, and so on.

During the execution phase, the state of the run may be monitored to detect user-triggered changes (e.g., skip element, skip column, skip table, stop). Additionally, statistics may be kept and provided to an interface or process associated with monitoring the execution. The state of the run and the acquired statistics may allow runtime control of the cloning and/or desensitizing with fine-grained resumability on a piece-by-piece basis.

The cloning and desensitizing may be provided to different applications and different data sets at different times. Thus, there may be different ways to identify a column to desensitize. In one example configuration, a data store may be populated with information concerning columns to be considered for desensitizing, sensitivity levels for columns, column names, algorithms to use to desensitize a column, and so on. In another example, metadata may be added to columns and/or tables to make the columns and/or tables more self-describing. Consider the two examples provided below.

In one example, the cloning and desensitizing may be performed for data stored in columns in tables associated with applications existing and known at the time the cloning and desensitizing systems and methods are produced. In this example, the cloning and desensitizing systems and methods may account for the pre-existing applications, columns, and tables by pre-defining candidate columns and pre-establishing relationships to desensitizing processes. Additional data (e.g., columns, identifiers) may be added to the existing data. The additional data may be added at the column level by, for example, updating a functional attribute in a table. The additional data may, additionally, and/or alternatively, be added at the table level by updating a table column attribute. This additional data may identify, for example, a sensitivity level of a column, an algorithm to use to desensitize a column, and so on. In one example, the functional attribute property may act as a default when a table column property is not available.

In another example, cloning and desensitizing may be performed for data stored in columns in tables associated with applications that come into existence or become known after the time the cloning and desensitizing systems and methods are produced. In this case, the cloning and desensitizing systems and methods can not possibly pre-account for the applications and data and therefore may interrogate data provided by the new applications and data. This data may identify, for example, columns to desensitize, sensitivity levels, algorithms to use to desensitize, and so on. This data may be provided as metadata logically associated with a column to be desensitized. Thus, in different examples, cloning and desensitizing systems and methods may be configured to work with both existing applications and data and also with yet to be produced applications and data.

In different examples, cloning and desensitizing may be performed for individual columns and/or tables, for sets of columns and tables associated with a single application, for sets of columns and tables associated with a set of applications, and/or for sets of columns and tables associated with a complete suite of applications. Thus, different levels of organization may be available for organizing information about columns and/or tables to be processed. A first level, which may be referred to as a "policy", includes an entity to aggregate functional attributes, table purge directives, and other desensitizing related information for one application or for a set of applications. Policies may in turn be aggregated into a second entity, which may be referred to as a policy set, which represents a complete description for the entire system.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a storage medium that participates in directly or indirectly storing signals, instructions and/or data. A computer-readable medium may take forms including non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor, or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software stored in a computer-readable medium, and/or combinations of each to perform a function(s) or an action(s), and/or to cause a function or action from another logic, method, and/or system. For example, based on a desired application or needs, logic may include a software controlled microprocessor, discrete logic (e.g., application specific integrated circuit (ASIC)), an analog circuit, a digital circuit, a programmed logic device, a memory device containing executable instructions, and so on. Logic does not refer to source code statements. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other tangible, physical items that can be received, transmitted and/or detected.

"Software", as used herein, includes but is not limited to, one or more computer or processor instructions that are executed and that cause a computer, processor, or other electronic device to perform functions, actions and/or behave in a desired manner. Software is to be treated as "software in execution", not simply a listing of source instructions stored on a computer readable medium. The instructions may be embodied in various executable forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servlet, an applet, instructions stored in a memory, part of an operating system or other types of executable instructions. It will be appreciated that computer-executable instructions can be located in one logic and/or distributed between two or more communicating, co-operating, and/or parallel processing logics and thus can be loaded and/or executed in serial, parallel, massively parallel and other manners.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to describe a sequence of operations that when executed produce a concrete, tangible, real-world result that produces a physical transformation. The operations may include physical manipulations of physical quantities. Usually, though not necessarily, the physical quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical, electronic quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. In some embodiments, blocks may be combined or separated into multiple components and/or may employ additional, not illustrated blocks. While the figures illustrate various actions occurring in serial, it is to be appreciated that in some embodiments some actions could occur concurrently, substantially in parallel, and/or at substantially different points in time.

In the flow diagrams, the illustrated elements denote "processing blocks" that may represent executable instructions that cause a computer, processor, and/or logic to respond, to perform an action(s), to change states, and/or to make decisions. Thus, the described methods can be implemented as processor executable instructions and/or operations provided by a computer-readable medium. In another example, the processing blocks may represent functions and/or actions performed by functionally equivalent circuits (e.g., an analog circuit, a digital signal processor circuit, an application specific integrated circuit (ASIC)). The elements illustrate functional information one skilled in the art could use to design/fabricate circuits, generate executable software, or use a combination of hardware and executable software to perform the illustrated processing.

FIG. 1 illustrates a method 100 associated with desensitizing data involved in a database cloning process. Method 100 includes, at 110, identifying a column to be desensitized. The column is a portion of a table in a database that will be cloned. Executable instructions will be needed to do the desensitization. Thus, method 100 includes, at 120, preparing a set of executable instructions to desensitize the column. With the set of executable instructions available, desensitization can begin. Thus, method 100 may also include, at 130, controlling a set of threads to desensitize the column. Method 100 may be integrated with the cloning of a database.

Identifying a column at 110 may include several actions. For example, identifying a column to be desensitized may include examining a column identification data stored in a data store in which the column is not stored. This may be, for example, a configuration file. The configuration file may be populated by application developers and/or database administrators who are familiar with which columns may need to be desensitized in various cloning actions. Additionally, and/or alternatively, identifying a column may include examining a column metadata. This metadata may be logically attached to a column and may be stored in a data store in which the column is stored. The column identification data and the column metadata may describe a column by providing its actual name and table, by describing a function (e.g., stores social security number), and so on. Additionally, the column identification data and the column metadata may describe a sensitivity level associated with the column. This sensitivity level may describe how sensitive the data is and thus may be used to select between desensitizing actions (e.g., removal, altering, replacing). The column identification data and the column metadata may also include data describing a column desensitizing level, and a column desensitizing algorithm. These attributes may be used to resolve a desensitizing algorithm.

Desensitizing a column may be performed in different ways. Thus, the instructions prepared at 120 may include instructions that will produce a value in a cloned column without copying a value from an original column. The instructions prepared at 120 may also include instructions for masking an original value from an original column in a cloned column, placing an altered version of a value from an original column in a cloned column, replacing a value from an original column with an SQL (structured query language) statement in a cloned column, replacing a value from an original column with a PL/SQL (procedural language/SQL) function call in a cloned column, and so on.

To improve security over conventional systems, the instructions prepared at 120 to do the desensitization may be required to achieve certain effects. For example, the desensitization performed by the threads controlled at 130 may be required to be irreversible. Thus, the desensitization does not include encrypting a value from an original column and placing the encrypted value in a cloned column. Furthermore, the threads controlled at 130 may be required to produce a cloned column that can not be identified as being cloned when viewed in isolation. When the cloned column is compared to the original column differences may be seen. When viewed by itself, however, there are no indicia that the cloned column is anything but an original column.

In one example, the set of executable instructions prepared at 120 may include an SQL statement, and/or a PL/SQL statement. Thus, the threads controlled at 130 may include a PL/SQL thread.

While FIG. 1 illustrates various actions occurring in serial, it is to be appreciated that various actions illustrated in FIG. 1 could occur substantially in parallel. By way of illustration, a first process could identify columns, a second process could prepare instructions, and a third process could control threads. While three processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform the methods (e.g., 100, 200, 300) described herein.

Figure 2:
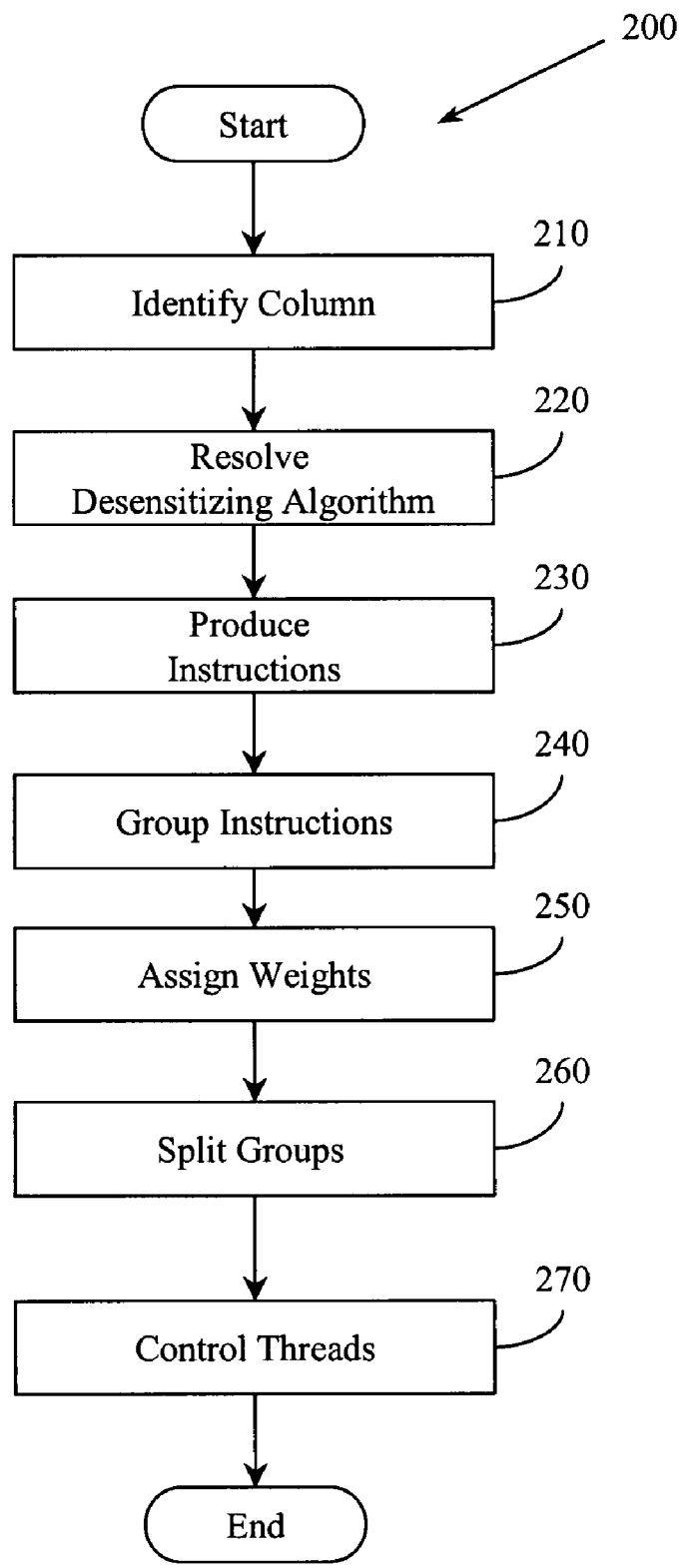
FIG. 2 illustrates an example method associated with desensitizing related to cloning.

FIG. 2 illustrates a method 200 associated with desensitizing data involved in a database cloning process. Like method 100 (FIG. 1), method 200 includes identifying columns at 210 and controlling threads at 270. However, method 200 also includes several actions involved in preparing instructions.

For example, method 200 may include, at 220, resolving a desensitizing algorithm associated with a column to be desensitized. Resolving the algorithm may include, for example, selecting an available algorithm, locating executable instructions configured to perform the algorithm, and establishing an address for the executable instructions so that they may be invoked to desensitize the column.

Method 200 may also include, at 230, producing a complete set of instructions for desensitizing a set of columns. The complete set of instructions may include instructions that are determined from the resolved desensitizing algorithm(s). Since there may be overlap between columns and/or tables, and since efficiency may be enhanced by organizing the instructions, method 200 may also include, at 240, selectively grouping members of the complete set of instructions into subsets of instructions. Subsets may be established where all the instructions in a single subset will operate on a single table. For example, a first subset may include instructions that all operate on a first table while a second subset may include instructions that all operate on a second table, and so on.

Method 200 may also include, at 250, selectively assigning a weight to an instruction and/or to a subset of instructions. The weight can be used to reorganize the instructions to improve efficiency. The weight may be based on factors including, for example, an operation to be performed by an instruction, a set of operations to be performed by a subset of instructions, and the size of the table on which an operation and/or subset of operations is to be performed.

With the weights assigned, method 200 may proceed, at 260, to selectively split a subset of instructions into two or more subsets of instructions and/or to move instructions between subsets. This sub-dividing and/or re-organizing may occur when it is determined that the two or more subsets of instructions may be executed in parallel. Thus, the single action of preparing instructions (120, FIG. 1) can, in one example, be seen to include several actions (e.g., 220 through 260). These actions can be viewed generically as generating all the possible instructions for all the possible columns to be desensitized, grouping the instructions by table, determining the importance, order, and/or intensity of the instructions, and then re-organizing the instructions based on that importance, order, and/or intensity. With the instructions prepared, method 200 may then proceed, at 270, to control threads to execute the instructions.

Figure 3:
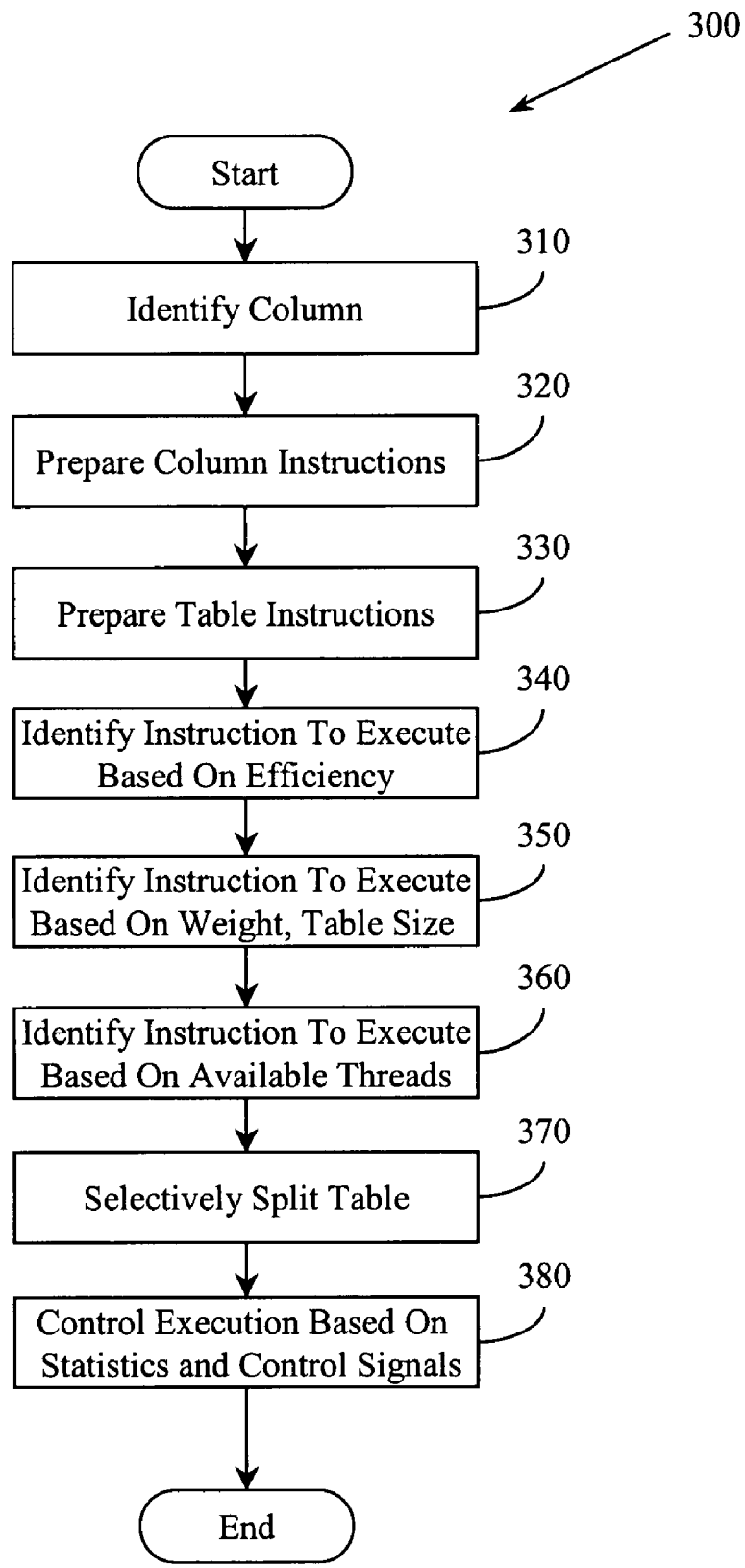
FIG. 3 illustrates an example method associated with desensitizing related to cloning.

FIG. 3 illustrates a method 300 associated with desensitizing data involved in a database cloning process. Method 300 may include, like method 100 (FIG. 1), identifying 310 a column (110, FIG. 1) and controlling threads (130, FIG. 1). Method 300 may also include additional actions.

For example, method 300 may, at 320, prepare instructions to desensitize columns and, at 330, prepare instructions to desensitize tables. Preparing instructions to desensitize a column may include actions like those described in FIG. 2, (e.g., blocks 220-260). Preparing instructions to desensitize a table may include first identifying a database table to desensitize and then preparing additional executable instructions to desensitize the table. These table instructions may include, for example, a truncate request for a table and a purge request for the table. In one example these instructions may be added to a subset of instructions configured to operate on columns associated with that table. In another example, the instructions may include a PL/SQL program that is configured to operate on the table. The PL/SQL program may be added upon determining that the subset of executable instructions includes a delete or an update statement associated with the table.

Method 300 may control a thread or cause a thread to select which instruction or subset of instructions it should process. With several subsets available, it may make sense to do a certain subset first or to do a certain subset in concert with (e.g., in parallel with) another subset. Thus, method 300 may include, at 340, controlling a thread to identify an instruction to execute based on a determination that having the thread execute that instruction or subset of instructions will improve an execution efficiency measure. This measure may predict overall execution time, likelihood of conflict resolution, completing a portion of a critical path, and so on.

Method 300 may also include, at 350, controlling a thread to identify an instruction to execute based on other factors. For example, a thread may identify an instruction and/or subset of instructions to execute based on an assigned weight. Additionally, and/or alternatively, a thread may identify an instruction and/or subset of instructions to execute based on the size of a table upon which an instruction will act.

Method 300 may also include, at 360, controlling a thread to identify an instruction and/or subset of instructions to execute based on a number of threads available to execute the instruction, a number of threads assigned to execute a group of instructions, and so on. These actions may attempt to cause subsets of threads that would benefit from having a certain number of threads operate in parallel to be executed when that number of threads is available.

As described above, efficiency may be improved when instructions and/or subsets of instructions can execute in parallel. Therefore, method 300 may include, at 370, controlling a thread to selectively split a table upon which an instruction will act into contiguous sets of rows. The splitting may occur upon determining that multiple threads could operate on the table in parallel.

Conventional systems may not have provided feedback concerning how a desensitizing and/or cloning operation was proceeding. This may have made it difficult, if possible at all, to selectively rollback operations, to customize execution, to monitor operations, and so on. Thus, method 300 may include controlling a thread to provide statistics concerning an operation the thread is to perform on a column. Additionally, and/or alternatively, method 300 may include controlling a thread to provide signals that can be monitored and/or used to control a larger process. The signals may include, for example, a success signal, an error signal, a failure signal, and so on. With these statistics and/or signals available, method 300 may include, at 380, selectively controlling desensitizing based on the statistics and/or signals.

Figure 4:
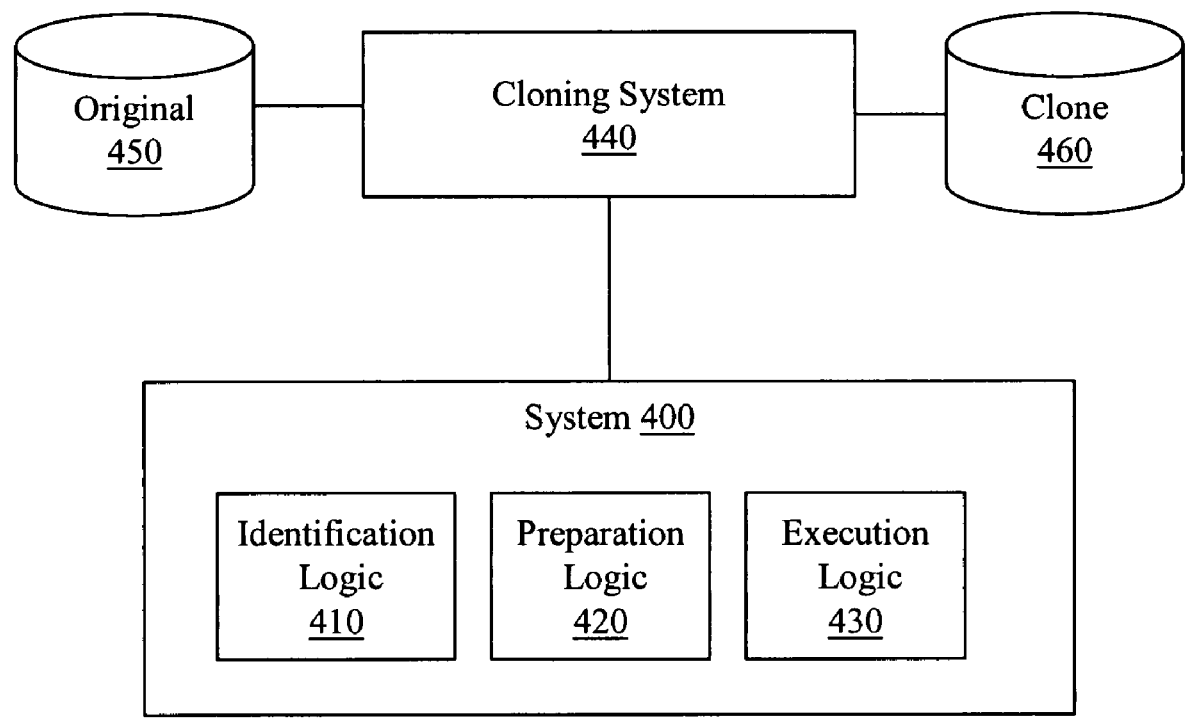
FIG. 4 illustrates an example system associated with desensitizing data in cloning.

FIG. 4 illustrates a system 400 associated with desensitizing data involved in a database cloning process. System 400 may include an identification logic 410, a preparation logic 420, and an execution logic 430 that participate in desensitizing data as a clone 460 of a database is made from an original 450 of a database by a cloning system 440.

Identification logic 410 may be tasked with identifying a column to be desensitized in association with the cloning of a database in which the column appears. System 400 may perform desensitizing that includes, for example, not placing a value from an original column in a cloned column, and placing an altered value in a cloned column. The altered value may be, for example, a constant, a random value within a defined range, a SQL statement, a PL/SQL function call, and so on. System 400 may perform desensitizing that is irreversible and that is not detectable when viewing a desensitized column in isolation.

System 400 may include a preparation logic 420 that is tasked with preparing a first set of executable instructions that will be used to desensitize a column. Instructions may be selected for the first set based, at least in part, on the requirements of a desensitizing algorithm resolved for the column. Different desensitizing algorithms may require different operations and thus may require different sets of executable instructions to perform these operations. The preparation logic 420 may also be tasked with preparing a second set of executable instructions. This second set may be configured to desensitize a table. Thus, preparation logic 420 may prepare instructions that are directed at columns and instructions that are directed at tables. To support efficient execution, and in particular parallel execution, the preparation logic 420 may organize instructions into bundles of tasks containing executable instructions. These tasks may include instructions from the first set of instructions and/or from the second set of instructions. In one example, a task will only store instructions that are to operate on a single table.

Execution logic 430 may be tasked with providing a set of threads to execute the bundles of tasks. In one example, providing the set of threads may include interacting with an operating system that can create, schedule, and/or control threads. In another example, providing the set of threads may include interacting with a thread manager that can create, schedule, and/or control threads. In yet another example, execution logic 430 may create, schedule, and/or control threads itself. In any of the examples, a thread is to select a bundle to execute. The selection may be based, at least in part, on the number of threads that are available to work on a bundle, on the total number of threads that are available to work on the bundles waiting to be executed, and/or on a prediction concerning a parallelism measure associated with the thread executing the bundle. The parallelism measure may describe the likelihood and/or benefit of having certain threads execute in parallel.

Figure 5:
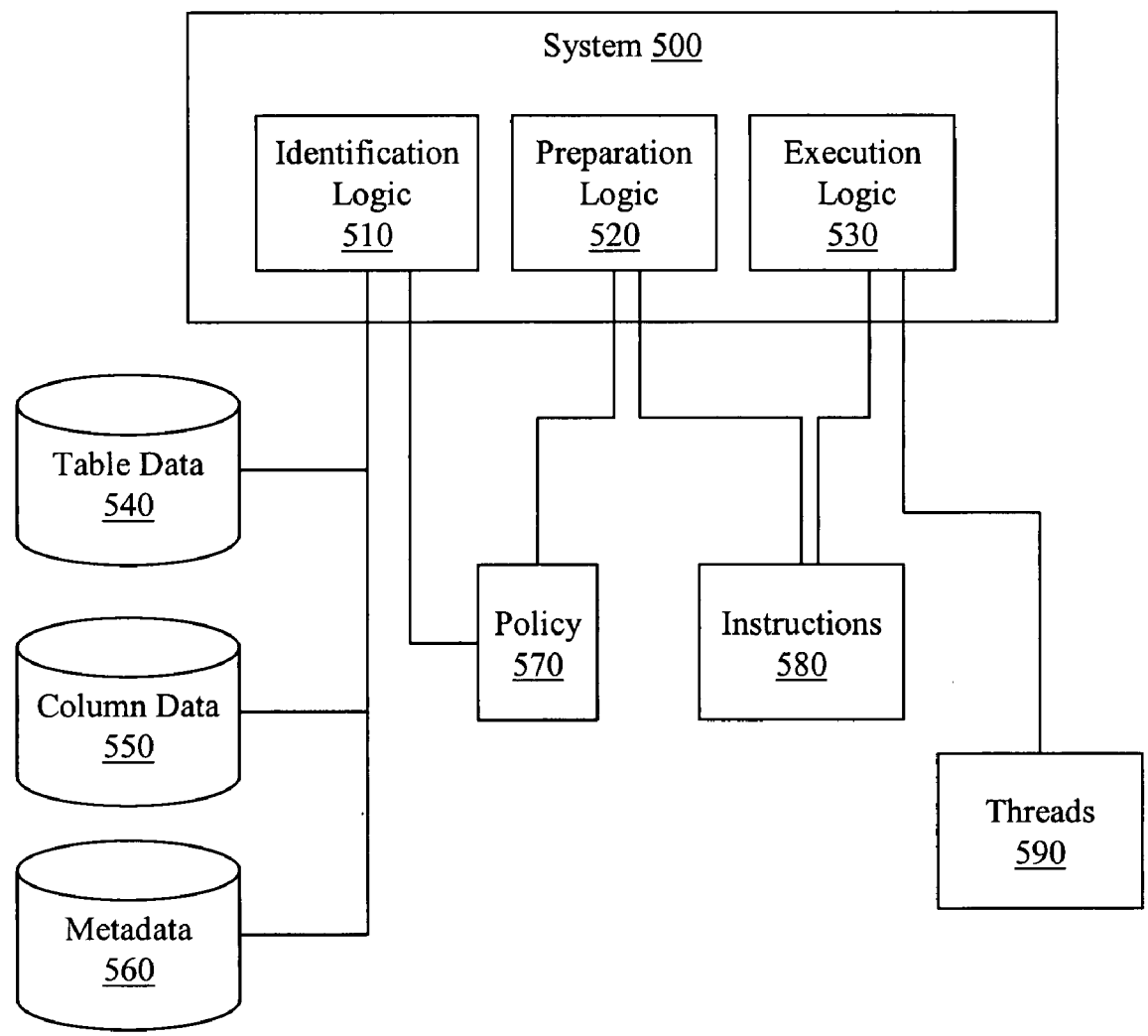
FIG. 5 illustrates an example system associated with desensitizing data in cloning.

FIG. 5 illustrates a system 500 associated with desensitizing data involved in a database cloning process. Like system 400 (FIG. 4), system 500 includes an identification logic 510, a preparation logic 520, and an execution logic 530. However, FIG. 5 also illustrates data stores from which data is gathered and products that are produced by the different logics.

For example, identification logic 510 may identify a column based on column identification data stored in a data store 550 and column metadata stored in a data store 560. The column identification data and the column metadata may describe an actual column and/or a functional column. The descriptions of these columns may include data concerning a column sensitivity level, a column desensitizing level, and/or a column desensitizing algorithm. FIG. 5 illustrates that the column identification data may be available in a data store 550. In one example, the column to be desensitized is not stored in data store 550. Thus, data store 550 may be considered to hold a configuration file that is not a part of the database to be cloned but that can be consulted to control, at least in part, the desensitizing performed during a cloning. FIG. 5 also illustrates that the column metadata may be stored in a data store 560 in which the column may also be stored. Thus the column metadata may be logically and/or physically attached to the column. In this case the column may be considered to be self-describing and the metadata can be considered to be part of the database.

In addition to processing column data, identification logic 510 may also process table data 540 that is stored in another data store. The table data 540 may describe a table to be purged, to be truncated, and so on as part of a cloning process. While the column data 550 is illustrated being stored in one data store and the table data 540 is illustrated being stored in another data store, it is to be appreciated that in some examples the two may be stored together. After collecting data from the data stores, the identification logic 510 will provide a policy 570 that describes columns to be desensitized and that may also describe tables to be desensitized. Sets of policies may be organized into a policy set.

Preparation logic 520 will produce a set of instructions 580. In one example, the preparation logic 520 will read the policy 570 and produce the set of instructions 580 based on information in the policy 570. However, not all instructions may be equal. Thus, preparation logic 520 may selectively assign a weight to an instruction and/or to a group of instructions. The weight may depend, for example, on an operation to be performed by the instruction, on the size of a table on which the instruction is to be performed, and so on.

The preparation logic 520 may also selectively organize instructions into groups of instructions. Instructions may be grouped together when the instructions all operate on a single table. Instructions may also be grouped together when it is determined that the groups may be executed in parallel. Thus, instructions 580 may include groups of instructions directed at individual tables and groups of instructions that may be executed in parallel. However, further parallelization may be possible at execution time.

Thus, execution logic 530 may control threads 590 to further reorganize instructions 580. This reorganization may be a dynamic process that occurs as threads execute instructions 580. For example, execution logic 530 may control a thread to selectively re-organize a first group of instructions into two or more second groups of instructions upon determining that the second groups of instructions may be executed in parallel. Similarly, execution logic 530 may control a thread to selectively split a table upon which a thread is to act into one or more contiguous sets of rows upon which one or more threads may then act in parallel.

Figure 6:
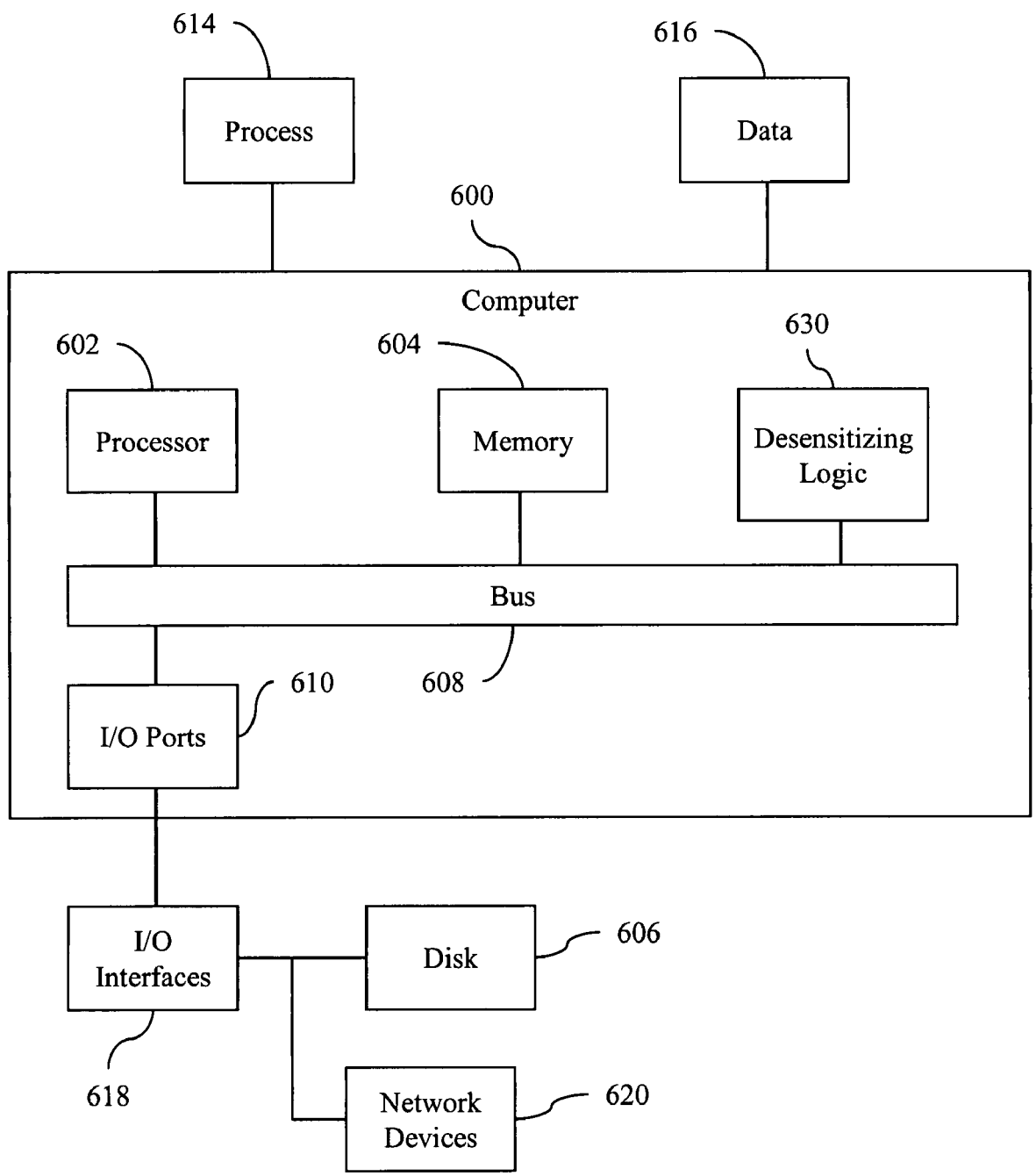
FIG. 6 illustrates an example computing environment in which example systems and methods illustrated herein can operate.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, the computer 600 may include a desensitizing logic 630 to desensitize data associated with cloning.

Desensitizing logic 630 may provide means (e.g., hardware, firmware, software in execution) for collecting information concerning data to desensitize in a database that is to be cloned. The collecting may include examining a configuration data store and/or metadata. Logic 630 may also provide means (e.g., hardware, firmware, software in execution) for identifying data to desensitize based, at least in part, on the collected information. The identifying may produce a policy. Logic 630 may also provide means (e.g., hardware, firmware, software in execution) for establishing a set of executable instructions to desensitize the data to desensitize and means (e.g., hardware, firmware, software in execution) for organizing the executable instructions into sets of instructions that operate on individual tables. Logic 630 may also provide means (e.g., hardware, firmware, software in execution) for dynamically re-organizing the sets of instructions upon determining that two or more subsets of instructions may be executed in parallel. Having provided means for collecting, identifying, preparing, and organizing, logic 630 may also provide means (e.g., hardware, firmware, software in execution) for monitoring and controlling the executable instructions while a database cloning process is in progress.

Generally describing an example configuration of the computer 600, the processor 602 can be a variety of various processors including dual microprocessor and other multiprocessor architectures. The memory 604 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices including a magnetic disk drive, a solid state disk drive, a floppy disk drive, a tape drive, a Zip drive, a flash memory card, and/or a memory stick. Furthermore, the disk 606 can include optical drives (e.g., CD-ROM, CD recordable drive (CD-R drive), CD rewriteable drive (CD-RW drive), digital video ROM drive (DVD ROM)). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and so on. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 620 can connect to WAN technologies including, but not limited to, point to point links, circuit switching networks (e.g., integrated services digital networks (ISDN)), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-readable medium storing processor executable instructions that when executed by a processor cause the processor to perform a method, the method comprising:
   identifying a column to be desensitized, the column being a portion of a table in a database;
   preparing a set of executable instructions to desensitize the column;
   controlling a set of threads to desensitize the column; and
   cloning at least the table of the database, at least in part, by executing the set of threads to generate a cloned table formed with the desensitized column.

2. The computer-readable medium of claim 1, where to desensitize a column includes one or more of, preventing a value from being copied from an original column to a cloned column, masking an original value from an original column in a cloned column, placing an altered value in a cloned column, replacing an original value from an original column with the result of a SQL (structured query language) statement in a cloned column, and replacing an original value from an original column with the result of a PL/SQL (procedural language/SQL) function call in a cloned column.

3. The computer-readable medium of claim 2, where a desensitization is irreversible and where a desensitized column is not identifiable by viewing the desensitized column in isolation.

4. The computer-readable medium of claim 1, where the set of executable instructions is to include one or more of, an SQL statement, and a PL/SQL statement and where the set of threads includes a PL/SQL thread.

5. The computer-readable medium of claim 1, where preparing a set of executable instructions includes resolving a desensitizing algorithm associated with a column to be desensitized.

6. The computer-readable medium of claim 5, where preparing a set of executable instructions includes producing a complete set of instructions based, at least in part, on the resolved desensitizing algorithm, and selectively grouping members of the complete set of instructions into one or more subsets of instructions, where all the instructions in a single subset are to operate on a single table or set of tables.

7. The computer-readable medium of claim 6, the method including selectively assigning a weight to one or more of, an instruction, and a subset of instructions based on one or more of, an operation to be performed by an instruction, and a table size on which an operation is to be performed.

8. The computer-readable medium of claim 7, the method including selectively splitting a subset of instructions into two or more subsets of instructions based on a likelihood of the two or more subsets of instructions being executed in parallel.

9. The computer-readable medium of claim 6, the method including identifying a database table to desensitize and preparing additional executable instructions to desensitize the table.

10. The computer-readable medium of claim 9, the method including adding one or more of, a truncate request for a table, and a purge request for the table, to a subset of instructions configured to operate on the table.

11. The computer-readable medium of claim 6, the method including selectively adding a PL/SQL program configured to operate on one or more tables in the database.

12. The computer-readable medium of claim 1, where identifying a column to be desensitized includes examining one or more of, a column identification data, and a column metadata, and
   where the column identification data and the column metadata describe one or more of, an actual column, a functional column, a column sensitivity level, a column desensitizing level, and a column desensitizing algorithm.

13. The computer-readable medium of claim 1, the method including controlling a thread to identify an instruction to execute based, at least in part, on a determination that having the thread execute the instruction will improve an execution efficiency measure.

14. The computer-readable medium of claim 13, the method including controlling a thread to identify an instruction to execute based on one or more of, a weight assigned to an instruction, a size of a table upon which an instruction will act, a number of threads available to execute the instruction, and a number of threads assigned to execute a group of instructions.

15. The computer-readable medium of claim 14, the method including controlling a thread to selectively split a table upon which an instruction will act into one or more contiguous sets of rows upon determining that one or more threads may operate on the table in parallel.

16. The computer-readable medium of claim 1, the method including controlling a thread to provide one or more statistics concerning an operation the thread is to perform on a column and controlling a thread to provide one or more of, a success signal, an error signal, and a failure signal concerning an operation the thread is to perform.

17. The computer-readable medium of claim 16, the method including selectively controlling the desensitizing based on one or more of, the statistics, the success signal, the error signal, and the failure signal.

18. The computer-readable medium of claim 1, where preparing a set of executable instructions includes populating a set of tables based, at least in part, on information stored in a policy, and where controlling a set of threads includes providing information from the set of tables to the threads.

19. A system, comprising:
   an identification logic to identify a column in database table from a database, where the column is to be desensitized in association with the database being cloned, where desensitizing the column includes one or more of, not placing a value from an original column in a cloned column, and placing an altered value in a cloned column, where the altered value may be one of, a constant, a random value within a defined range, the result of a SQL statement, and the result of a PL/SQL function call, where the desensitizing is irreversible and where the desensitizing is not detectable by viewing a desensitized column in isolation;

a preparation logic to prepare a first set of executable instructions to be used to desensitize and clone a column, the members of the first set of executable instructions being selected based, at least in part, on a desensitizing algorithm resolved for the column, the preparation logic also to prepare a second set of executable instructions to desensitize and clone a table, the preparation logic to create one or more bundles of tasks containing executable instructions from the first set of instructions and the second set of instructions, where a task is to contain instructions that operate on the table; and an execution logic to provide a set of threads to execute the bundles of tasks containing executable instructions for at least cloning the table, where a thread is to select a bundle to execute based on one or more of, a number of threads available to work on the bundle, a total number of threads available to work on the bundles, and a prediction concerning a parallelism measure associated with the thread executing the bundle.

20. The system of claim 19, where the identification logic is to identify a column based on column identification data and column metadata that describe one or more of, an actual column, a functional column, a column sensitivity level, a column desensitizing level, and a column desensitizing algorithm, where the column identification data is to be available in a data store, and where the column metadata is to be logically attached to the column, and where the identification logic is to provide a policy that describes the column to be desensitized.

21. The system of claim 20, where the preparation logic is to read the policy and to selectively assign a weight to an instruction based on an operation to be performed by the instruction and the size of a table on which the operation is to be performed.

22. The system of claim 21, where the preparation logic is to selectively organize instructions into a group of instructions when the group of instructions may be executed in parallel with another group of instructions.

23. The system of claim 22, where a thread is to selectively re-organize a first group of instructions into two or more second groups of instructions upon determining that the second groups of instructions may be executed in parallel.

24. The system of claim 23, where a thread is to selectively split a table upon which a thread is to act into one or more contiguous sets of rows upon which one or more threads may then act in parallel.

25. A system, comprising:
   means for collecting information concerning data to desensitize in a database that is to be cloned;
   means for identifying data to desensitize based, at least in part, on the collected information;
   means for establishing a set of executable instructions to desensitize the data to desensitize;
   means for organizing the executable instructions into sets of instructions that operate on individual tables
   means for dynamically re-organizing the sets of instructions upon determining that two or more subsets of instructions may be executed in parallel; and
   means for monitoring and controlling the executable instructions while a database cloning process is in progress.

* * * * *